(12) United States Patent
Matsubushi et al.

(10) Patent No.: US 12,139,432 B2
(45) Date of Patent: Nov. 12, 2024

(54) METHOD FOR MANUFACTURING GLASS PLATE AND APPARATUS FOR MANUFACTURING SAME

(71) Applicant: Nippon Electric Glass Co., Ltd., Shiga (JP)

(72) Inventors: Taisei Matsubushi, Shiga (JP); Masao Nakajima, Shiga (JP); Hiroshi Takimoto, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 320 days.

(21) Appl. No.: 17/802,762

(22) PCT Filed: Feb. 22, 2021

(86) PCT No.: PCT/JP2021/006686
§ 371 (c)(1),
(2) Date: Aug. 26, 2022

(87) PCT Pub. No.: WO2021/182095
PCT Pub. Date: Sep. 16, 2021

(65) Prior Publication Data
US 2023/0084567 A1    Mar. 16, 2023

(30) Foreign Application Priority Data
Mar. 12, 2020   (JP) ................................. 2020-042990

(51) Int. Cl.
*C03B 33/033* (2006.01)
*B28D 5/00* (2006.01)

(52) U.S. Cl.
CPC .......... *C03B 33/033* (2013.01); *B28D 5/0011* (2013.01); *B28D 5/0052* (2013.01)

(58) Field of Classification Search
CPC .......... B26D 1/045; B26D 7/01; B26D 7/015; C03B 33/03; C03B 33/033; C03B 33/037; C03B 2225/02
See application file for complete search history.

(56) References Cited

U.S. PATENT DOCUMENTS

| | | | |
|---|---|---|---|
| 2003/0029848 A1 | 2/2003 | Borgeson et al. | |
| 2016/0151929 A1* | 6/2016 | Ogushi | C03B 33/033 225/2 |

FOREIGN PATENT DOCUMENTS

| | | | |
|---|---|---|---|
| CN | 201424433 | 3/2010 | |
| CN | 102300688 A * | 12/2011 | ............. B26F 3/002 |

(Continued)

OTHER PUBLICATIONS

International Search Report dated May 18, 2021 in corresponding International Application No. PCT/JP2021/006686.
(Continued)

*Primary Examiner* — Jennifer S Matthews
(74) *Attorney, Agent, or Firm* — Wenderoth, Lind & Ponack, L.L.P.

(57) ABSTRACT

After a glass sheet (G) having a scribe line (S) formed thereon is placed on a placement table (10) and positioned so that the scribe line (S) is positioned in a bending stress applying portion (15) of the placement table (10), when the glass sheet (G) is split along the scribe line (S) by applying a bending stress to a formation region of the scribe line (S) by the bending stress applying portion (15), the glass sheet (G) is positioned by laying a resin sheet (9) under the glass sheet (G) on the placement table (10) and aligning one side (G1) of the glass sheet (G) extending in a direction along the scribe line (S) with marks (Ma to Nd) projected onto a protruding portion (9a) of the resin sheet (9) by laser markers (16a to 16d).

10 Claims, 8 Drawing Sheets

(56) References Cited

FOREIGN PATENT DOCUMENTS

| | | | | |
|---|---|---|---|---|
| CN | 106116132 A | * | 11/2016 | |
| JP | 2004-195366 | | 7/2004 | |
| JP | 2005-519762 | | 7/2005 | |
| JP | 2008-229716 | | 10/2008 | |
| JP | 2015-30661 | | 2/2015 | |
| JP | 2015030661 A | * | 2/2015 | |
| JP | 2017-14031 | | 1/2017 | |
| JP | 2017-14032 | | 1/2017 | |
| JP | 2019038238 A | * | 3/2019 | ............. B28D 1/225 |
| RU | 2696473 C1 | * | 8/2019 | ........... B24B 41/068 |
| WO | 2015/182298 | | 12/2015 | |

OTHER PUBLICATIONS

International Preliminary Report on Patentability and Written Opinion of the International Searching Authority dated Sep. 6, 2022 in corresponding International Application No. PCT/JP2021/006686.

* cited by examiner

METHOD FOR MANUFACTURING GLASS PLATE AND APPARATUS FOR MANUFACTURING SAME

TECHNICAL FIELD

The present invention relates to a technology for positioning a glass sheet so that a scribe line is positioned in a bending stress applying portion of a placement table and splitting the glass sheet along the scribe line.

BACKGROUND ART

As is well known, in the field of manufacturing a glass sheet, for example, a plurality of glass sheets, which are to be utilized as products, are cut out from one glass sheet, or unnecessary glass parts are cut and removed. As a technology for this purpose, there has been publicly known a technology for positioning a glass sheet having a scribe line formed thereon on a placement table, and then splitting the glass sheet along the scribe line.

As a specific example thereof, in Patent Literature 1, there is disclosed that a placement table that holds a glass sheet is formed of a fixed table and a rotary table adjacent thereto, and under a state in which a scribe line of the glass sheet is positioned between both the tables, the glass sheet is split by turning the rotary table downward.

CITATION LIST

Patent Literature 1: JP 2015-30661 A

SUMMARY OF INVENTION

Technical Problem

Incidentally, in the technology disclosed in Patent Literature 1, the glass sheet is positioned by positioning the scribe line of the glass sheet between both the tables, and a gap is present between both the tables. Because of this, unless the scribe line is positioned at the center of the gap (center of an area between both the tables), the glass sheet cannot be accurately positioned. However, in Patent Literature 1, there is no disclosure of a technology for this purpose. In addition, even when the gap is not present between both the tables, it may be difficult to see the scribe line, and hence accurate positioning of the glass sheet becomes difficult. In addition, in order to prevent a scratch from occurring on a lower surface of the glass sheet, the glass sheet is placed on a resin sheet at the time of positioning. However, due to the presence of the resin sheet, it becomes difficult to visually recognize the gap between both the tables, and hence accurate positioning of the glass sheet becomes more difficult. Because of the above-mentioned circumstances, in the technology disclosed in Patent Literature 1, there is a risk of causing defects such as splitting of the glass sheet at a position displaced from the scribe line and generation of chipping and waviness on a cleaved surface.

From the above-mentioned viewpoints, the present invention has an object to accurately position a glass sheet having a scribe line formed thereon on a placement table, thereby being capable of appropriately splitting the glass sheet.

Solution to Problem

According to a first aspect of the present invention that has been made in order to achieve the above-mentioned object, there is provided a manufacturing method for a glass sheet, comprising: a preparation step of preparing a glass sheet having a scribe line formed thereon; a positioning step of placing the prepared glass sheet on a placement table and positioning the glass sheet so that the scribe line is positioned in a bending stress applying portion of the placement table; and a splitting step of splitting the glass sheet along the scribe line by applying, after the positioning step, a bending stress to a formation region of the scribe line by the bending stress applying portion, wherein the positioning step comprises: laying a resin sheet under the glass sheet on the placement table; and aligning one side of the glass sheet extending in a direction along the scribe line with a mark projected onto the placement table by a laser marker.

According to this method, when the one side of the glass sheet is aligned with the mark projected by the laser marker, the scribe line of the glass sheet can be accurately positioned in the bending stress applying portion of the placement table. The reason for this is as described below. The distance from the scribe line to the one side of the glass sheet is known in advance, and hence the position of the mark can be accurately set in advance by setting the distance from the bending stress applying portion to the mark to be the same as the above-mentioned distance that is known in advance. Accordingly, when the bending stress applying portion has a length in a direction orthogonal to the scribe line, the scribe line of the glass sheet can be accurately positioned at a center position in the length direction. In addition, even when it is difficult to see the scribe line, the scribe line can be accurately positioned at the center position of the bending stress applying portion in the length direction. The reason for the foregoing is that the position of the mark can be set in advance so that the distance from the center position of the bending stress applying portion in the length direction to the mark is set to be the same as the above-mentioned distance that is known in advance. With this configuration, the glass sheet can be appropriately split by applying the bending stress to an optimum position of the glass sheet. In addition, the mark to be a reference in alignment of the glass sheet is projected by the laser marker, and hence a projection position thereof, that is, the position to be a reference for the alignment can be easily changed. Further, the resin sheet is laid under the glass sheet. Accordingly, the situation in which a lower surface (back surface) of the glass sheet is scratched or the like at the time of alignment is less liable to occur, and the glass sheet is appropriately protected.

In this method, it is preferred that the positioning step comprise causing the resin sheet to protrude from the one side of the glass sheet and projecting the mark onto a protruding portion.

With this configuration, as compared to the case in which the mark is directly projected onto an upper surface (front surface) of the placement table, positional displacement at the time of alignment of the one side of the glass sheet with the mark is less liable to occur. As a result, alignment of the one side of the glass sheet with the mark can be further accurately performed.

In this method, it is preferred that the resin sheet lack translucency.

When the resin sheet lacking translucency is laid under the glass sheet, it is difficult to visually recognize the placement table due to the presence of the resin sheet, with the result that it becomes difficult to accurately position the scribe line in the bending stress applying portion of the placement table while visually observing the scribe line. According to the above-mentioned method, the one side of the glass sheet is aligned with the mark projected by the laser marker. As a result, even when the resin sheet lacking translucency is used, the scribe line of the glass sheet can be accurately positioned in the bending stress applying portion of the placement table.

In the above-mentioned method, the positioning step may comprise aligning the one side of the glass sheet with the mark by integrally moving the glass sheet and the resin sheet.

With this configuration, the one side of the glass sheet can be aligned with the mark without sliding the glass sheet in contact with an upper surface of the resin sheet, and the situation in which the lower surface of the glass sheet is scratched or the like is further less liable to occur.

In the above-mentioned method, the mark may be a line-shaped mark extending in the direction along the scribe line.

With this configuration, operation of aligning the one side of the glass sheet with the mark can be quickly and easily performed, and operability can be enhanced.

In the above-mentioned method, a plurality of laser markers may be provided, and the marks may be projected onto a plurality of locations of the resin sheet in a direction orthogonal to the scribe line by the plurality of laser markers.

With this configuration, splitting can be performed under a state in which a plurality of distances from the bending stress applying portion to the marks are set, and hence the splitting length of the glass sheet can be appropriately changed.

In this method, wherein the marks projected onto the plurality of locations may comprise a mark projected from an upper side by one of the plurality of laser markers installed on an upper side of the placement table and a mark projected from a lateral side by one of the plurality of laser markers installed on one end side of the placement table in the direction along the scribe line.

With this configuration, the installation spaces of the laser markers are less liable to be subject to restrictions, which is advantageous from the viewpoint of layout. In particular, when the interval between the marks adjacent to each other is small, the situation in which laser markers adjacent to each other interfere with each other can be avoided.

In the above-mentioned method, the scribe line may be formed by causing a scribe tip to move while pressing a surface of the glass sheet, to thereby form a recess line by plastic deformation on the surface of the glass sheet, and then causing an initial crack to propagate along the recess line.

According to such formation processing of a scribe line, it becomes difficult to see the scribe line as compared to the case in which the scribe line is formed through use of a scribe wheel. Even in such case, the positioning of the glass sheet for positioning the scribe line in the bending stress applying portion is performed by merely aligning the one side of the glass sheet with the mark, and hence a problem caused by difficulty in seeing the scribe line does not occur.

In the above-mentioned method, the placement table may be formed of a pair of placement tables foldably coupled to each other, and the bending stress applying portion may be an area between opposing end portions of the pair of placement tables.

With this configuration, when a gap is formed in the area between opposing end portions of the pair of placement tables, the scribe line of the glass sheet can be accurately positioned at a center position of the gap. Further, the bending stress is applied to the formation region of the scribe line of the glass sheet in the area between opposing end portions of both the tables by merely folding the pair of placement tables. As a result, the splitting operation of the glass sheet can be easily and quickly performed.

In this method, the splitting step may comprise causing the pair of placement tables to hold the glass sheet by suction through the resin sheet.

With this configuration, when the glass sheet is split by folding the pair of placement tables, positional displacement of the glass sheet is less liable to occur. As a result, the glass sheet can be more accurately split along the scribe line. In this case, the resin sheet has air permeability in a thickness direction.

According to a second aspect of the present invention that has been made in order to achieve the above-mentioned object, there is provided a manufacturing apparatus for a glass sheet, the apparatus being configured to, under a state in which a glass sheet having a scribe line formed thereon is placed on a placement table, and the glass sheet is positioned so that the scribe line is positioned in a bending stress applying portion of the placement table, split the glass sheet along the scribe line by applying a bending stress to a formation region of the scribe line by the bending stress applying portion, wherein the glass sheet is positioned by laying a resin sheet under the glass sheet on the placement table and aligning one side of the glass sheet extending in a direction along the scribe line with a mark projected onto the placement table by a laser marker.

According to the above-mentioned manufacturing apparatus, in the same manner as in the manufacturing method described above, the scribe line of the glass sheet is accurately positioned in the bending stress applying portion of the placement table, thereby being capable of appropriately splitting the glass sheet along the scribe line. Further, the situation in which the lower surface of the glass sheet is scratched or the like is less liable to occur.

Advantageous Effects of Invention

According to the present invention, it is possible to accurately position the glass sheet having the scribe line formed thereon on the placement table, thereby being capable of appropriately splitting the glass sheet.

DESCRIPTION OF EMBODIMENTS

A manufacturing method and a manufacturing apparatus for a glass sheet according to an embodiment of the present invention are described below with reference to the attached drawings.

Figure 1:
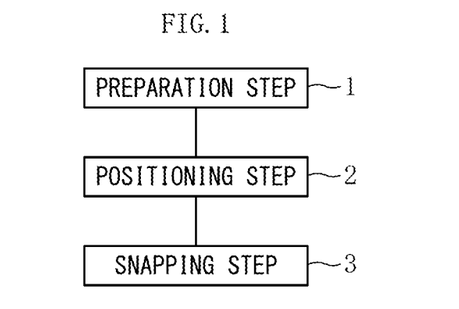
FIG. 1 is a schematic configuration diagram for illustrating a manufacturing method for a glass sheet according to an embodiment of the present invention.

As illustrated in FIG. 1, the manufacturing method for a glass sheet comprises a preparation step 1 of preparing a glass sheet having a scribe line formed thereon, and a positioning step 2 of placing the prepared glass sheet on a placement table and positioning the glass sheet so that the scribe line is positioned in a bending stress applying portion provided on the placement table. Further, the manufacturing method comprises a splitting step 3 of splitting the glass sheet along the scribe line by applying, after the positioning step 2, a bending stress to a formation region of the scribe line by the bending stress applying portion.

Figure 2A:
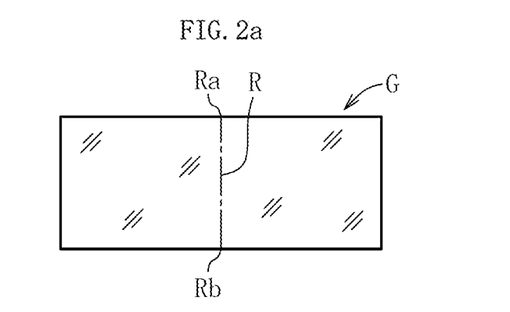
FIG. 2a is an illustration of a process of forming a scribe line in the manufacturing method for a glass sheet according to the embodiment of the present invention, and is a plan view of the glass sheet.
Figure 2B:
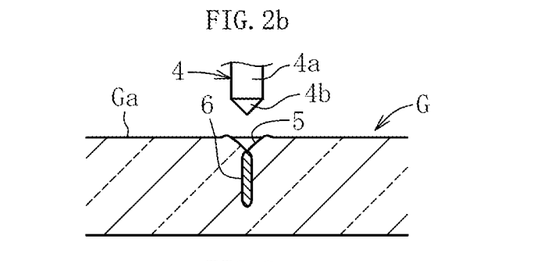
FIG. 2b is an illustration of the process of forming the scribe line in the manufacturing method for a glass sheet according to the embodiment of the present invention, and is a vertical sectional view of the glass sheet.

In each of FIG. 2a to FIG. 2d, there is illustrated, regarding a glass sheet G having a scribe line formed thereon prepared in the preparation step 1, a method of forming a scribe line. First, in the glass sheet G having a preset cutting line R as illustrated in FIG. 2a, a recess line 5 by plastic deformation along the preset cutting line R is formed through use of a scribe tip 4 as illustrated in FIG. 2b. The scribe tip 4 is of a pencil type, and comprises a shank portion 4a and a V-shaped tip portion 4b fixed to an end portion of the shank portion 4a. It is preferred that the tip portion 4b for example, a monocrystalline or polycrystalline diamond tip. However, the tip portion 4b may be made of PCBN, ceramic, a cemented carbide alloy, or other metal. Then, when the tip portion 4b of the scribe tip 4 is moved from a start point Ra to an end point Rb on the preset cutting line R of FIG. 2a while pressing the glass sheet G, the recess line 5 by plastic deformation having a cross-section that forms a V-shape is formed on a surface Ga of the glass sheet G as illustrated in FIG. 2b. A vertically long tensile stress layer 6 is formed inside the recess line 5.

Figure 2C:
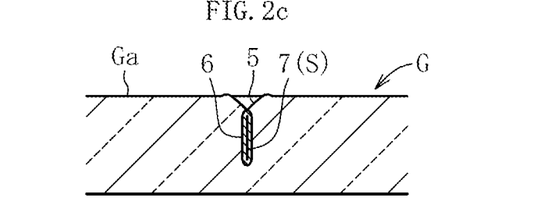
FIG. 2c is an illustration of the process of forming the scribe line in the manufacturing method for a glass sheet according to the embodiment of the present invention, and is a vertical sectional view of the glass sheet.
Figure 2D:
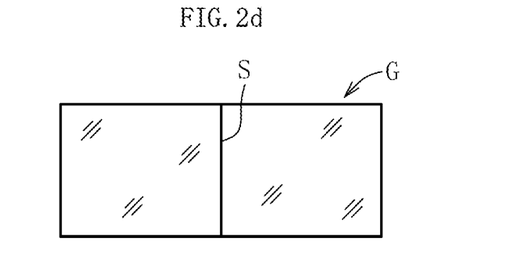
FIG. 2d is an illustration of the process of forming the scribe line in the manufacturing method for a glass sheet according to the embodiment of the present invention, and is a plan view of the glass sheet.

In this case, at the end point Rb of the preset cutting line R, the tip portion 4b makes a cut (such as scratch or chipping) in an edge of the glass sheet G, to thereby form an initial crack 7 in the tensile stress layer 6 as illustrated in FIG. 2c. With the passage of time thereafter, the initial crack 7 propagates from the end point Rb to the start point Ra along the recess line 5 due to the action of the tensile stress of the tensile stress layer 6, and as a result, a scribe line S along the entire length of the recess line 5 is formed as illustrated in FIG. 2d.

Figure 3:
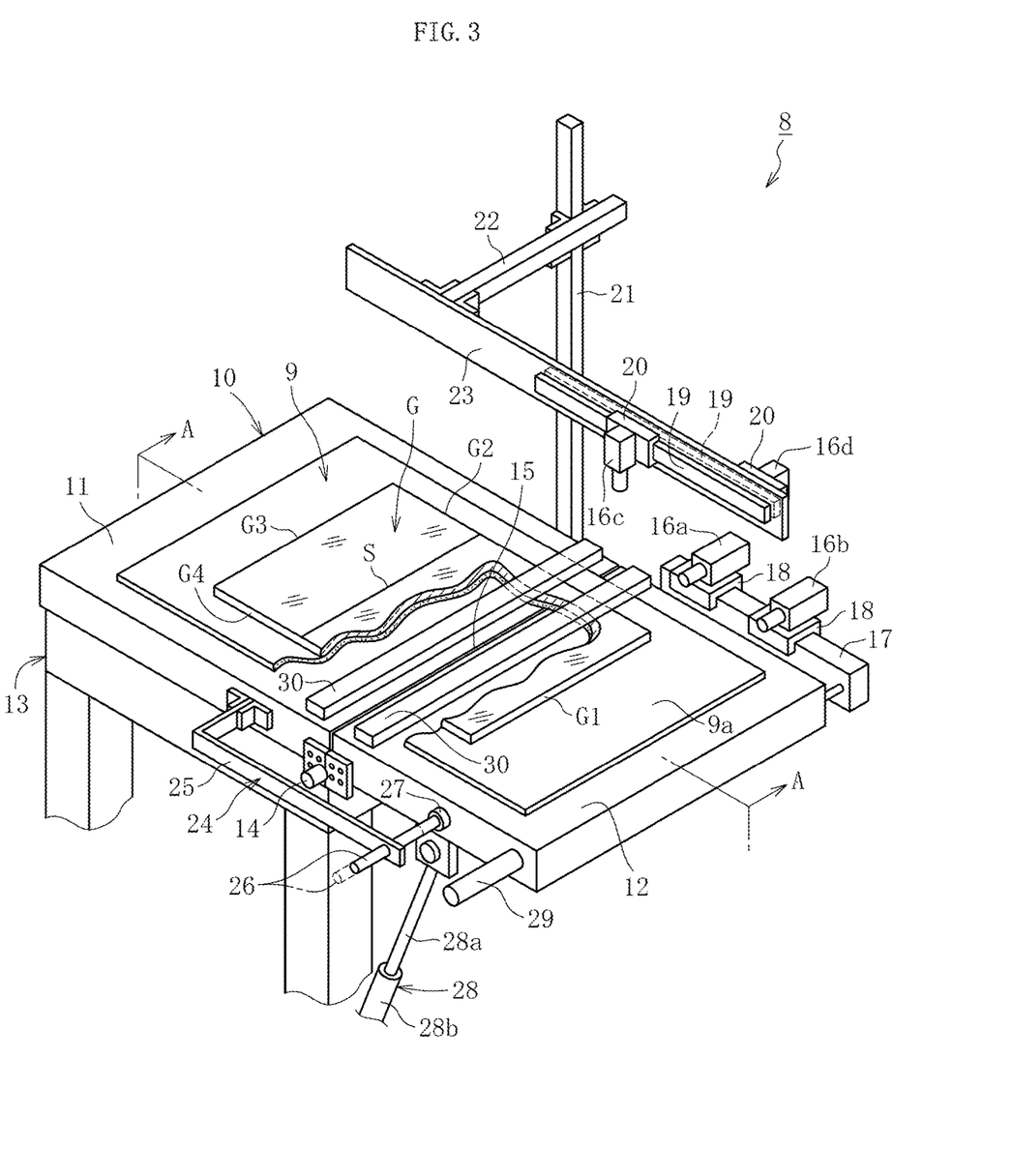
FIG. 3 is a perspective view for illustrating an overall configuration of a manufacturing apparatus for a glass sheet according to the embodiment of the present invention.

FIG. 3 is a perspective view for illustrating a manufacturing apparatus 8 for a glass sheet to be used for performing the positioning step 2 and the splitting step 3. As illustrated in FIG. 3, the manufacturing apparatus 8 for a glass sheet comprises a placement table 10 on which the glass sheet G (glass sheet having the scribe line S formed on an upper surface side) and a resin sheet 9 are placed under a state in which the resin sheet 9 is laid under the glass sheet G. The placement table 10 is formed of a pair of placement tables 11 and 12 foldably coupled to each other. Of the pair of placement tables 11 and 12, the placement table 11 on one side is a fixed table fixed to an upper end of a frame 13, and the placement table 12 on another side is a movable table that is turned downward from the state illustrated in FIG. 3 with a turning shaft 14 as a fulcrum. In the following description, a side closer to an area 15 between opposing end portions between the fixed table 11 and the movable table 12 is defined as an inner side, and a side farther from the area 15 between opposing end portions is defined as an outer side. In addition, a direction along a longitudinal direction of the area 15 between opposing end portions (direction along the scribe line S of the glass sheet G in the state of being positioned described later) is referred to as "width direction", and a direction orthogonal to the width direction is referred to as "length direction".

The resin sheet 9 is in a state of protruding from four sides G1, G2, G3, and G4 of the glass sheet G. Then, a line-shaped (linear) mark serving as a positioning reference for the glass sheet G is projected onto a protruding portion 9a of the resin sheet 9 from the side (side on an end portion side on the outer side of the movable table 12) G1 on one side of the glass sheet G in the length direction. In this embodiment, line-shaped marks are projected onto a plurality of locations (four locations in this example) in the length direction. These line-shaped marks are projected by a plurality of (four in this example) laser markers 16a to 16d.

The arrangement states of the plurality of laser markers 16a to 16d are as described below. The first laser marker 16a and the second laser marker 16b for each projecting a line-shaped mark from a lateral side onto the protruding portion 9a of the resin sheet 9 are arranged on one end side of the movable table 12 in the width direction. The laser markers 16a and 16b are mounted on two lower sliders 18 that are slidably fitted to one lower rail 17 extending in the length direction, and are directed in the lateral direction. The lower rail 17 is fixed to one end portion of the movable table 12 in the width direction. In the illustrated example, the first laser marker 16a and the second laser marker 16b are directed in a horizontal direction in the lateral direction, but may be directed obliquely downward in the lateral direction (see FIG. 5).

The third laser marker 16c and the fourth laser marker 16d for each projecting a line-shaped mark from an upper side onto the protruding portion 9a of the resin sheet 9 are arranged on an upper side of a center portion of the movable table 12 in the width direction. The height positions of the laser markers 16c and 16d are higher than the height positions of the first laser marker 16a and the second laser marker 16b. In addition, the third laser marker 16c and the fourth laser marker 16d are mounted on upper sliders 20 that are slidably fitted to two upper rails 19 extending in the length direction, respectively, and are directed downward. More specifically, a vertical support column 21 extending in an upward direction is fixed to one end portion of the fixed table 11 in the width direction, a lateral support column 22 extending in the width direction is fixed to an upper portion of the vertical support column 21, and a support plate 23 extending in the length direction is fixed to a tip end of the lateral support column 22. Then, the upper rails 19 are fixed to both sides of the support plate 23 in the width direction, respectively, and the upper sliders 20 are slidably fitted to the upper rails 19, respectively, in the length direction.

A stopper mechanism 24 for firmly holding the movable table 12 in the posture illustrated in FIG. 3 (posture at the time of positioning of the glass sheet G) is arranged on another end side of the fixed table 11 and the movable table 12 in the width direction. The stopper mechanism 24 comprises a fixed arm 25, a stopper member 26, and an engaged body 27. The fixed arm 25 comprises a base end portion fixed to another end surface of the fixed table 11 in the width direction and extends from the fixed table 11 side to the movable table 12 side. The stopper member 26 is held in a tip end portion of the fixed arm 25 so that the stopper member 26 can be pushed and pulled in the width direction. The engaged body 27 is fixed to another end surface of the movable table 12 in the width direction, and a tip end portion of the stopper member 26 can be engaged with and disengaged from the engaged body 27. In the stopper mechanism 24, when the stopper member 26 is pushed toward one end side in the width direction, the tip end portion of the stopper member 26 is engaged with the engaged body 27 as indicated by the solid line in FIG. 3. When the stopper member 26 is pulled out toward another end side in the width direction from this state, the tip end portion of the stopper member 26 is disengaged from the engaged body 27 as indicated by the chain line in FIG. 3.

Further, an elastic support mechanism 28 for elastically supporting the movable table 12 is arranged on another end side of the fixed table 11 and the movable table 12 in the width direction. The elastic support mechanism 28 is formed of a spring cylinder. More specifically, an upper end portion of a piston rod 28a of the spring cylinder 28 is turnably coupled to a lower surface portion of the movable table 12, and a lower end portion of a cylinder tube 28b of the spring cylinder 28 is turnably coupled to a side surface portion of the frame 13 (see FIG. 9). The spring cylinders 28 are arranged in a plurality of locations in the width direction (for example, both end portions in the width direction). A handle 29 for allowing an operator to turn the movable table 12 downward is fixed to an end portion on the outer side on another end surface of the movable table 12 in the width direction. Accordingly, when the tip end portion of the stopper member 26 is disengaged from the engaged body 27, the movable table 12 is brought into a state of being elastically supported by the elastic support mechanism (spring cylinder) 28. When the handle 29 is pushed down in this state, the movable table 12 is turned downward with the turning shaft 14 as a fulcrum.

In addition, pressing members 30 for pressing the glass sheet G from above are arranged at a position of an inner side end region of the fixed table 11 and a position of an inner side end region of the movable table 12, respectively. The pressing members 30 are members each having a flat plate shape or the like extending in the width direction, and are configured to be individually moved up and down by a vertically elevating mechanism (not shown). When the pressing members 30 are at an upper movable end (see the pressing members 30 drawn by the solid lines in FIG. 6), a sufficient gap is formed between a lower surface of each of the pressing members 30 and an upper surface of the glass sheet G. In addition, when the pressing members 30 are at a lower movable end (see the pressing members 30 drawn by the chain lines in FIG. 6), the lower surface of each of the pressing members 30 presses the upper surface of the glass sheet G.

Figure 4:
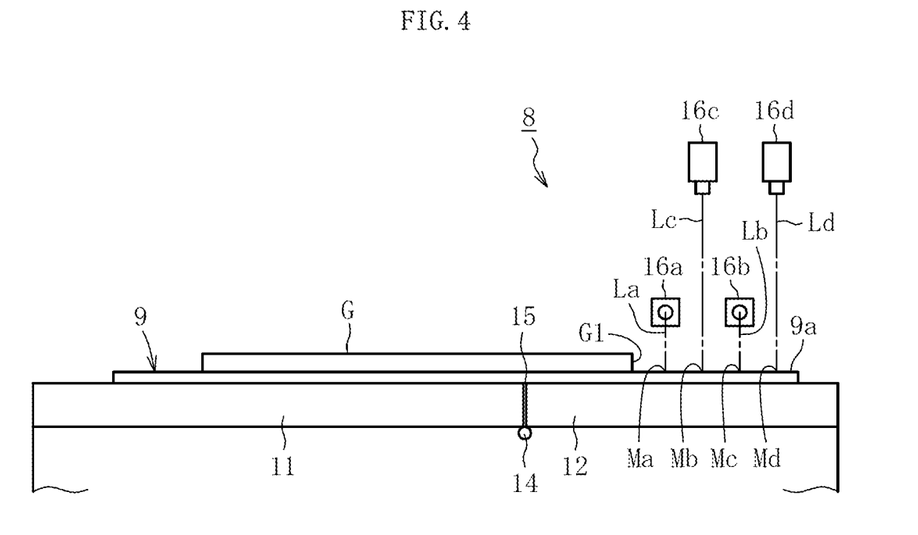
FIG. 4 is a front view for illustrating main parts of the manufacturing apparatus for a glass sheet according to the embodiment of the present invention.
Figure 5:
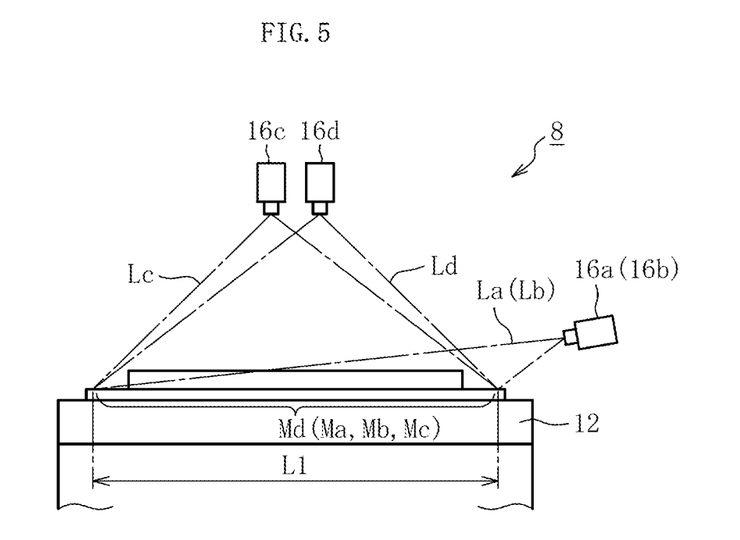
FIG. 5 is a side view for illustrating the main parts of the manufacturing apparatus for a glass sheet according to the embodiment of the present invention.

FIG. 4 is a schematic view of the irradiation mode of laser lights from the first to fourth laser markers 16a to 16d as viewed from another end side of the fixed table 11 and the movable table 12 in the width direction. As illustrated in FIG. 4, the laser markers 16a to 16d are arranged in the order of the first laser marker 16a, the second laser marker 16b, the third laser marker 16c, and the fourth laser marker 16d from the inner side to the outer side of the movable table 12. Accordingly, laser lights La and Lb from the laser markers 16a and 16b on one end side of the movable table 12 in the width direction and laser lights Lc and Ld from the laser markers 16c and 16d on the upper side of the movable table 12 are alternately radiated. As a result, first to fourth line-shaped marks Ma, Mb, Mc, and Md extending in the width direction are projected onto the protruding portion 9a of the resin sheet 9 (see FIG. for more detail). FIG. 5 is a schematic view of the irradiation mode of the laser lights from the first to fourth laser markers 16a to 16d as viewed from the end portion side on the outer side of the movable table 12. As illustrated in FIG. 5, the laser lights La and Lb from the first laser marker 16a and the second laser marker 16b are radiated to be diffused from the lateral side, and the laser lights Lc and Ld from the third laser marker 16c and the fourth laser marker 16d are radiated to be diffused from the upper side. As a result, the length of each of the first to fourth line-shaped marks Ma to Md in the width direction projected onto the protruding portion 9a of the resin sheet 9 becomes L1. The lengths of the four line-shaped marks Ma to Md in the width direction are not required be the same as in the illustrated example, and in addition, the positions in the length direction onto which those marks are projected are not particularly limited as long as the positions are overlapped with the first side G1 of the glass sheet G in the length direction.

Figure 6:
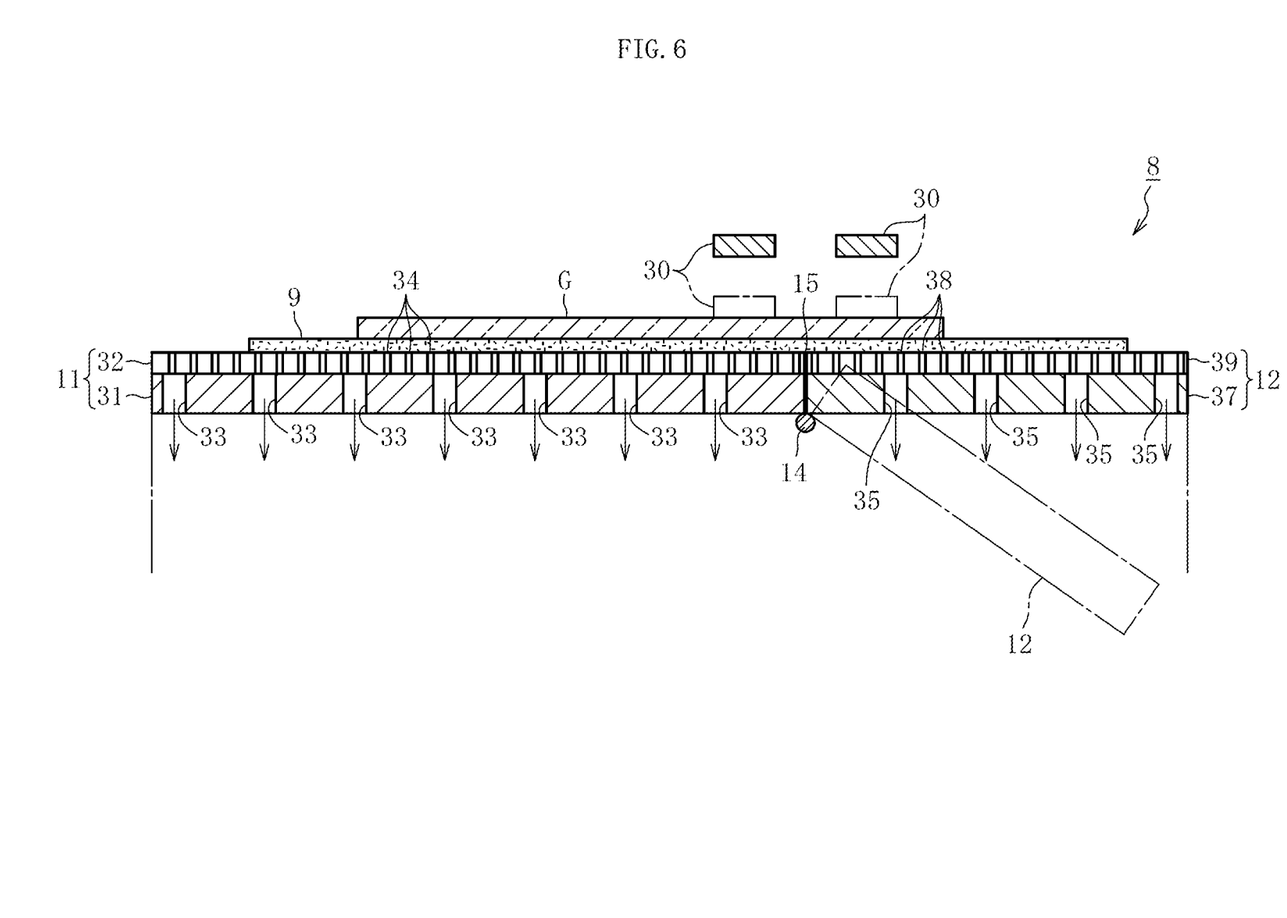
FIG. 6 is a vertical sectional front view for illustrating the main parts of the manufacturing apparatus for a glass sheet according to the embodiment of the present invention.

FIG. 6 is an enlarged vertical sectional side view taken along the line A-A of FIG. 3. As illustrated in FIG. 6, the fixed table 11 comprises a lower layer board 31 and an upper layer board 32 laminated on the lower layer board 31 by bonding or the like. The lower layer board 31 is made of a punching metal or the like in which a plurality of large-diameter through holes 33 along a thickness direction are formed, and has air permeability in the thickness direction. The upper layer board 32 is made of a resin board in which holes 34 having diameters smaller than those of the through holes 33 of the lower layer board 31 are formed in a larger number as compared to the through holes 33 (directions and number of the holes 34 are not limited to those in the illustrated example), a porous resin board, or the like, and has air permeability in a thickness direction. In addition, similarly to the fixed table 11, the movable table 12 also comprises a lower layer board 37 in which through holes 35 are formed and an upper layer board 39 in which holes 38 are formed. Accordingly, when air is drawn in the direction indicated by the arrows through the through holes 33 and 35 formed in the lower layer boards 31 and 37 of the fixed table 11 and the movable table 12, the glass sheet G is held by suction with a negative pressure by the fixed table 11 and the movable table 12 through the resin sheet 9. In this embodiment, the resin sheet 9 lacks translucency.

Next, a manufacturing method for a glass sheet through use of the manufacturing apparatus S having the above-mentioned configuration is described.

Figure 7:
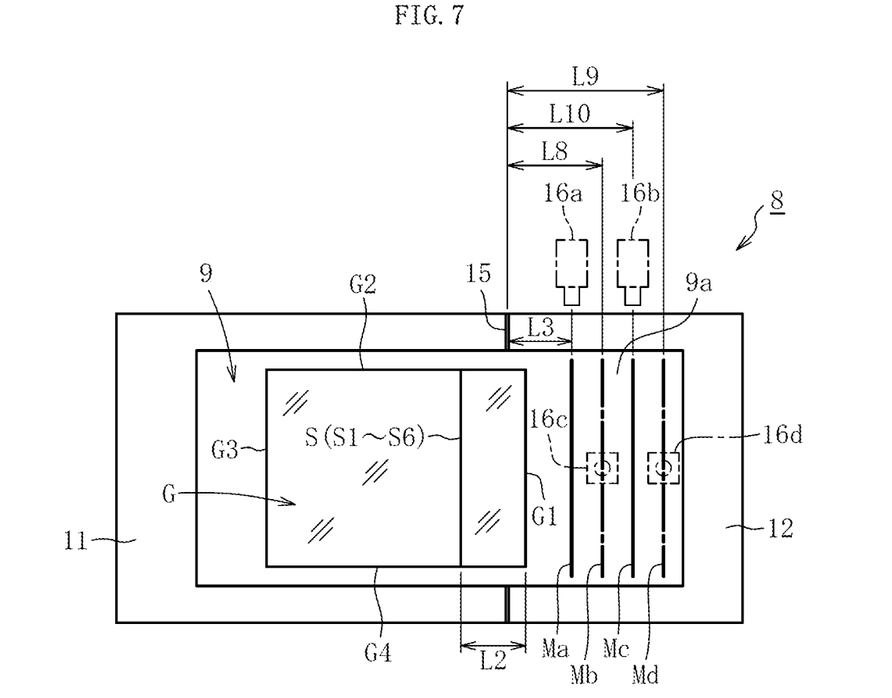
FIG. 7 is a plan view for illustrating a state of carrying out a manufacturing method for a glass sheet according to the embodiment of the present invention.

After the glass sheet G having the scribe line S formed thereon is prepared in the preparation step 1, the positioning step 2 is performed on the prepared glass sheet G. In the positioning step 2, as illustrated in FIG. 7, under a state in which the resin sheet 9 is laid under the glass sheet G having the scribe line S positioned on an upper surface side, both the glass sheet G and the resin sheet 9 are placed on the fixed table 11 and the movable table 12. In this case, when the sizes of the glass sheet G and the resin sheet 9 are small, both the glass sheet G and the resin sheet 9 may also be placed only on the fixed table 11. At this time, each of the pressing members 30 is positioned at the upper movable end. Further, at this time, the first to fourth line-shaped marks Ma to Md by the first to fourth laser markers 16a to 16d are projected onto the protruding portion 9a of the resin sheet 9 from the side (hereinafter referred to as "first side") G1 on one side of the glass sheet G in the length direction. In FIG. 7, for convenience, the two line-shaped marks Ma and Mc by the laser markers 16a and 16b on one end side of the movable table 12 in the width direction are indicated by the solid lines, and the two line-shaped marks Mb and Md by the laser markers 16c and 16d on the upper side of the center portion of the movable table 12 in the width direction are indicated by the chain lines. In the illustrated example, there is only one scribe line S formed on the glass sheet G at a predetermined position in the length direction, and hence only the first line-shaped mark Ma may be projected without projecting all the four line-shaped marks Ma to Md.

Figure 8:
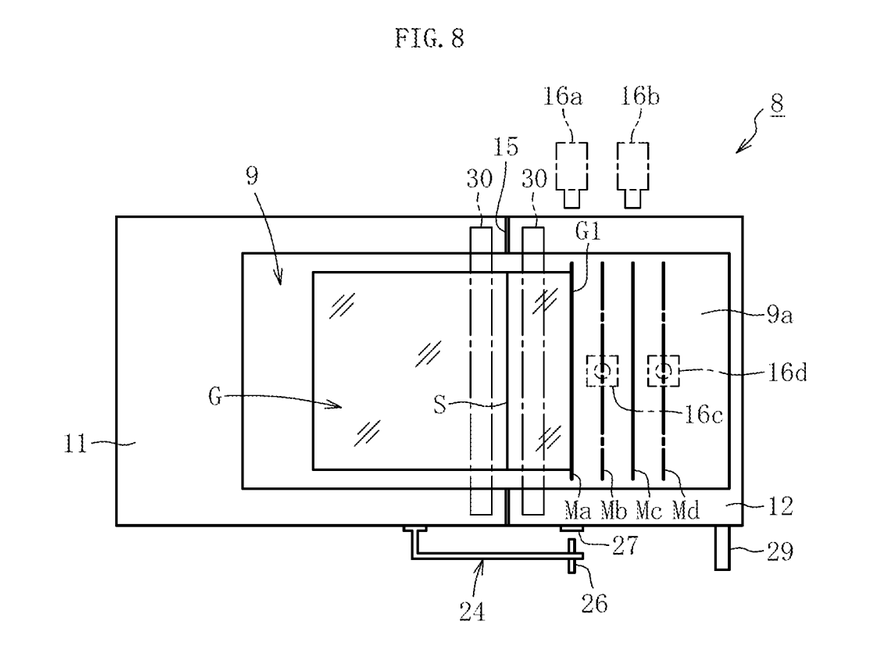
FIG. 8 is a plan view for illustrating the state of carrying out the manufacturing method for a glass sheet according to the embodiment of the present invention.

In this case, a distance L2 from the scribe line S of the glass sheet G to the first side G1 is known in advance. Thus, at this time, a position of the first laser marker 16a is set so that a spacing distance L3 between the area 15 between opposing end portions of both the tables 11 and 12 (specifically, the center position of the area 15 between opposing end portions in the length direction) and the first line-shaped mark Ma is set to be the same as the distance L2. In this state, the glass sheet G and the resin sheet 9 are integrally moved toward the end portion side on the outer side of the movable table 12. Then, as illustrated in FIG. 8, when the first side G1 of the glass sheet G is aligned with the first line-shaped mark Ma, the glass sheet G and the resin sheet 9 are stopped. As a result, the scribe line S of the glass sheet G is positioned in the area 15 between opposing end portions of both the tables 11 and 12. At this point, the stopper member 26 of the stopper mechanism 24 is engaged with the engaged body 27.

Figure 9:
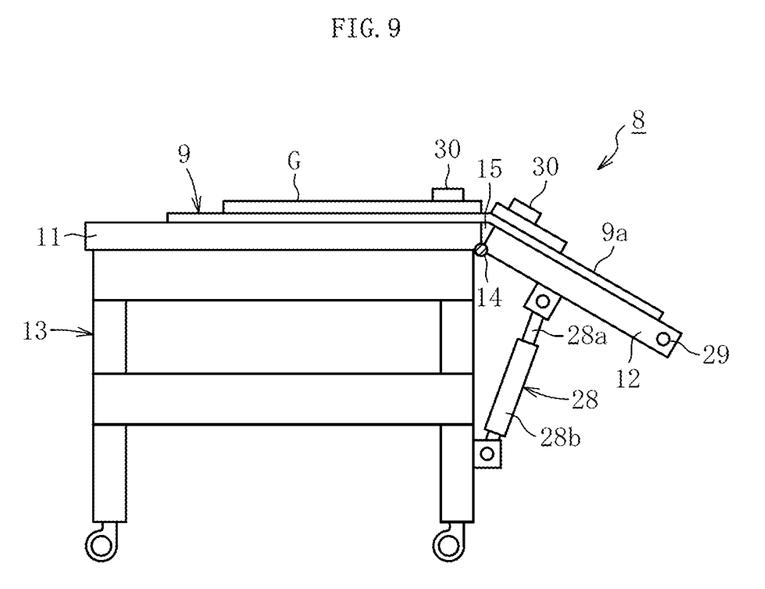
FIG. 9 is a front view for illustrating the state of carrying out the manufacturing method for a glass sheet according to the embodiment of the present invention.

After the positioning step 2 is performed as described above, the splitting step 3 is performed. In the splitting step 3, the pressing members 30 are moved down to press the glass sheet G from above. Simultaneously with this, the glass sheet G is held by suction by the fixed table 11 and the movable table 12 through the resin sheet 9. After that, the stopper member 26 of the stopper mechanism 24 is disengaged from the engaged body 27 as illustrated in FIG. 8, to thereby elastically support the movable table 12 by the spring cylinder 28. After such state is obtained, the handle 29 is pushed down to turn the movable table 12 downward with the turning shaft 14 as a fulcrum while the spring cylinder 28 is contracted as illustrated in FIG. 9. While this operation is performed, a bending stress is applied to the formation region of the scribe S of the glass sheet G in the area 15 between opposing end portions of both the tables 11 and 12, and as a result, the glass sheet G is split along the scribe line S. More specifically, a small gap is present in the area 15 between opposing end portions of both the tables 11 and 12 in the state illustrated in each of FIG. 7 and FIG. 8, and the gap is gradually increased from the time when the movable table 12 starts being turned downward. Due to the folding between the fixed table 11 and the movable table 12 in association with the foregoing, the glass sheet G is split with the area 15 between opposing end portions of both the tables 11 and 12 as the bending stress applying portion. As a result, the splitting step 3 is finished. After that, when the next positioning step 2 is started, each constituent element is returned to the state illustrated in FIG. 3 again. In this case, when the distance L2 from the scribe line S of the glass sheet G prepared in the preparation step 1 to the first side G1 is different from that of the glass sheet G as exemplified above, the positioning step 2 and the splitting step 3 may be performed in the same manner as in the above-mentioned case by appropriately using any one of the second line-shaped mark Mb, the third line-shaped mark Mc, and the fourth line-shaped mark Md. Although different resin sheets 9 are used every time the positioning step 2 and the splitting step 3 are performed, the same resin sheet 9 may be used.

Figure 10:
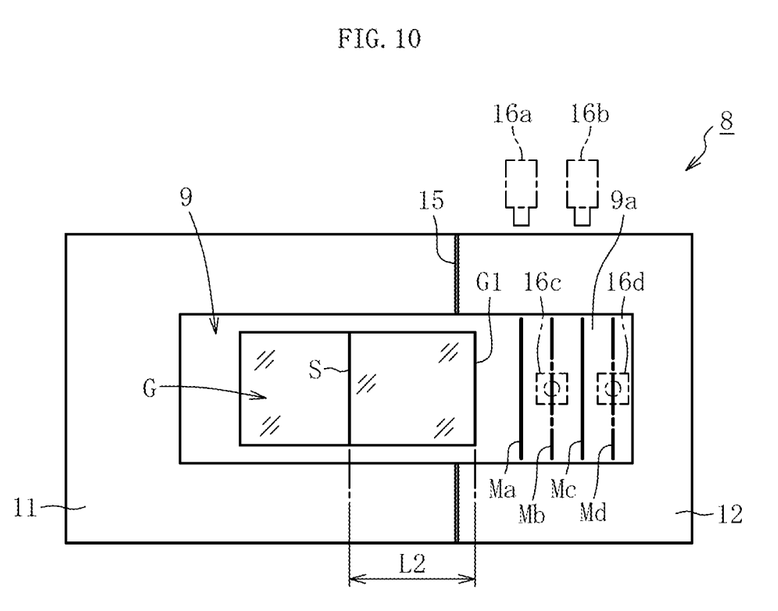
FIG. 10 is a plan view for illustrating the state of carrying out the manufacturing method for a glass sheet according to the embodiment of the present invention.
Figure 11:
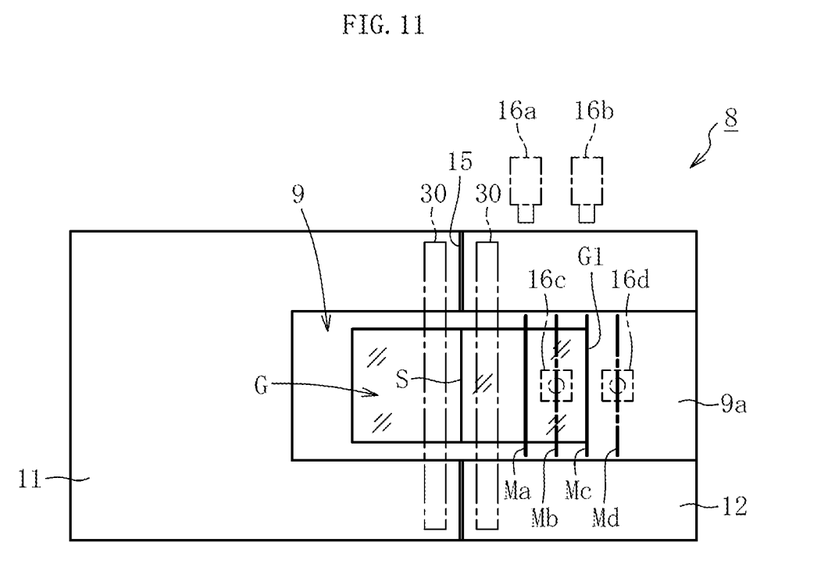
FIG. 11 is a plan view for illustrating the state of carrying out the manufacturing method for a glass sheet according to the embodiment of the present invention.

In each of FIG. 10 and FIG. 11, there is illustrated a mode in which the positioning step 2 is performed on the glass sheet G having a size relatively smaller than that in the above-mentioned case and having the distance L2 between the scribe line S and the first side G1 which is relatively longer than that in the above-mentioned case. As illustrated in each of FIG. 10 and FIG. 11, the size of the resin sheet 9 is also decreased along with a decrease in size of the glass sheet G. Meanwhile, when the position of the area 15 between opposing end portions of both the tables 11 and 12 is defined as a reference, the moving distance at a time when the glass sheet G and the resin sheet 9 are moved toward the outer side of the movable table 12 becomes longer. Accordingly, as illustrated in FIG. 11, when the first side G1 of the glass sheet G is aligned with the third line-shaped mark Mc, the scribe line S of the glass sheet G is positioned in the area 15 between opposing end portions of both the tables 11 and 12. The splitting step 3 for the glass sheet G is performed in the same manner as in the above-mentioned case. Also in this case, when the distance L2 from the scribe line S to the first side G1 is different from that of the glass sheet G as exemplified above, the positioning step 2 and the splitting step 3 may be performed in the same manner as in the above-mentioned case by appropriately using any one of the first line-shaped mark Ma, the second line-shaped mark Mb, and the fourth line-shaped mark Md.

Figure 12:
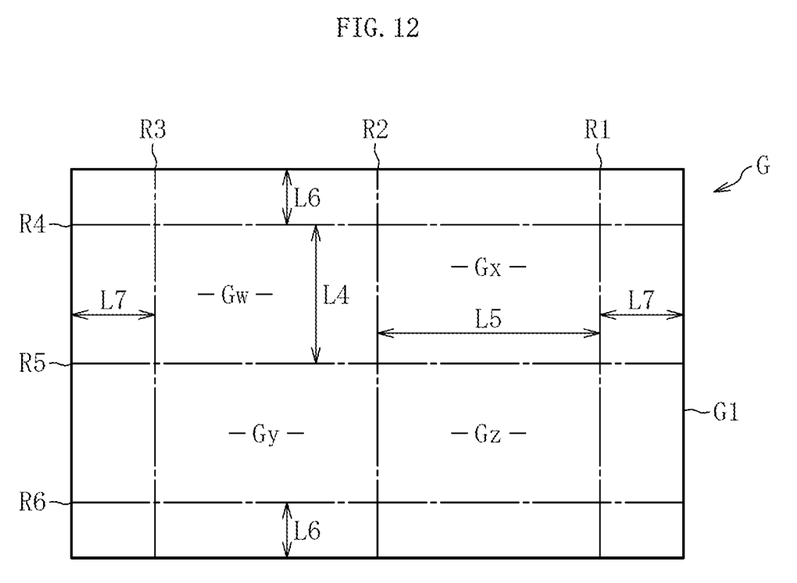
FIG. 12 is a plan view for illustrating a glass sheet to be used in the manufacturing method for a glass sheet according to the embodiment of the present invention.

The manufacturing method for a glass sheet as described above is advantageous when the positioning step 2 and the splitting step 3 of the glass sheet G as described below are performed. That is, as illustrated in FIG. 12, the glass sheet G here comprises a first preset cutting line R1, a second preset cutting line R2, and a third preset cutting line R3 extending in the width direction (vertical direction) and a fourth preset cutting line R4, a fifth preset cutting line R5, and a sixth preset cutting line R6 extending in the length direction (lateral direction). In this case, four regions Gw, Gx, Gy, and Gz on a center side of the glass sheet G are product regions, and other regions are regions to be removed as unnecessary parts. The four product regions Gw to Gz have the same size. The preset cutting lines may be formed so that the number of the product regions having the same size is less than four or more than four. In FIG. 12, a widthwise dimension L4 of each of the four product regions Gw to Gz, a lengthwise dimension L5 thereof, a widthwise dimension L6 of each of the unnecessary parts at both ends in the width direction, and a lengthwise dimension L7 of each of the unnecessary parts at both ends in the length direction have the following relationship.

$$L6<L7<L4<L5$$

In the glass sheet G, the widthwise dimensions of the unnecessary parts at both ends in the width direction may be different from each other, and the lengthwise dimensions of the unnecessary parts at both ends in the length direction may also be different from each other.

Figure 13:
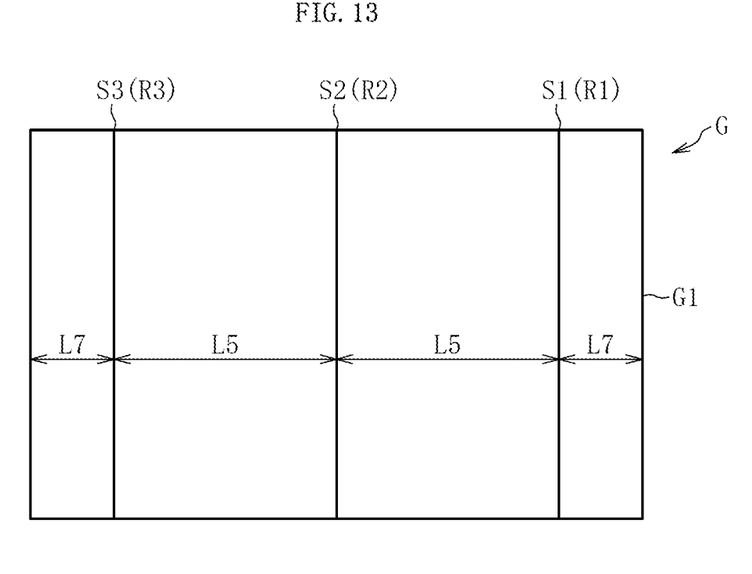
FIG. 13 is a plan view for illustrating the glass sheet to be used in the manufacturing method for a glass sheet according to the embodiment of the present invention.

Regarding the glass sheet G of the illustrated example, first, as illustrated in FIG. 13, a first scribe line S1, a second scribe line S2, and a third scribe line S3 are formed along the first preset cutting line R1, the second preset cutting line R2, and the third preset cutting line R3. Regarding the glass sheet G on which the scribe lines S1 to S3 are formed in this manner, the side G1 on one side of the glass sheet G in the length direction is defined as a first side, and position adjustment of the third laser marker 16c has been performed so that the distance L7 from the first scribe line S1 to the first side G1 is set to be the same as a distance L8 from the area 15 between opposing end portions of both the tables 11 and 12 to the second line-shaped mark Mb illustrated in FIG. 7. Further, regarding the glass sheet G illustrated in FIG. 13, position adjustment of the fourth laser marker 16d has been performed so that the distance L5 from the first scribe line S1 to the second scribe line S2 is set to be the same as a distance L9 from the area 15 between opposing end portions of both the tables 11 and 12 to the fourth line-shaped mark Md illustrated in FIG. 7.

In such state, first, the first side G1 of the glass sheet G is aligned with the second line-shaped mark Mb. As a result, the first scribe line S1 of the glass sheet G is positioned in the area 15 between opposing end portions of both the tables 11 and 12, and then the splitting step 3 is performed in the same manner as in the above-mentioned case. The split unnecessary part is removed. After that, regarding the remaining glass sheet piece obtained by removing the unnecessary part from the glass sheet G illustrated in FIG. 13, the portion that has been the first scribe line S1 becomes the first side, and hence this first side is aligned with the fourth line-shaped mark Md. As a result, the second scribe line S2 of the glass sheet piece is positioned in the area 15 between opposing end portions of both the tables 11 and 12, and then the splitting step 3 is performed in the same manner as in the above-mentioned case. A split first glass sheet piece Gs (see FIG. 14) is accommodated. After that, regarding the remaining glass sheet piece having the first glass sheet piece Gs removed therefrom, the portion that has been the second scribe line S2 becomes the first side, and hence this first side is aligned with the fourth line-shaped mark Md. As a result, the third scribe line S3 of the glass sheet piece is positioned in the area 15 between opposing end portions of both the tables 11 and 12, and then the splitting step 3 is performed in the same manner as in the above-mentioned case. A split second glass sheet piece Gt (see FIG. 14) is accommodated, and unnecessary parts are removed.

Figure 14:
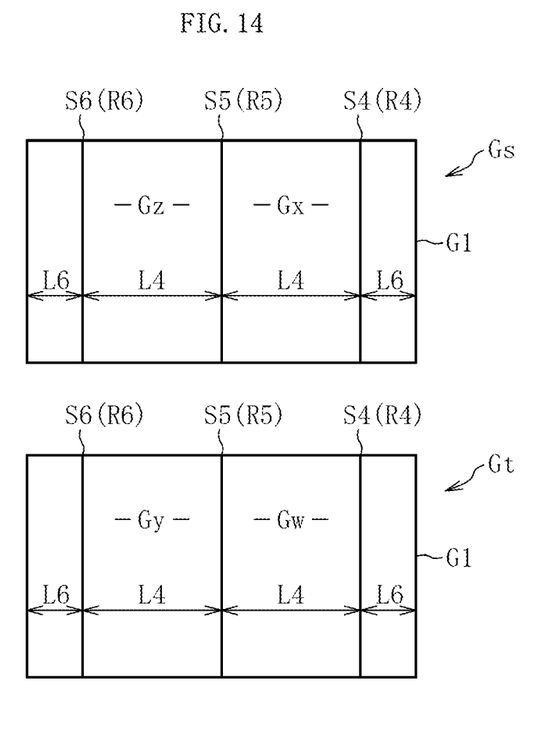
FIG. 14 is a plan view for illustrating two glass sheet pieces to be used in the manufacturing method for a glass sheet according to the embodiment of the present invention.

In FIG. 14, there is illustrated that, under a state in which the above-mentioned accommodated first glass sheet piece Gs and second glass sheet piece Gt are rotated by 90°, the fourth scribe line S4, the fifth scribe line S5, and the sixth scribe line S6 are formed along the fourth preset cutting line R4, the fifth preset cutting line R5, and the sixth preset cutting line R6. Regarding the first glass sheet piece Gs on which the scribe lines S4 to S6 are formed in this manner, the side G1 on one side of the glass sheet piece Gs in the length direction is defined as a first side, and position adjustment of the first laser marker 16a has been performed so that the distance L6 from the fourth scribe line S4 to the first side G1 is set to be the same as the distance L3 from the area 15 between opposing end portions of both the tables 11 and 12 to the first line-shaped mark Ma illustrated in FIG. 7. Further, regarding the first glass sheet piece Gs illustrated in FIG. 14, position adjustment of the second laser marker 16b has been performed so that the distance L4 from the fourth scribe line S4 to the fifth scribe line S5 is set to be the same as a distance L10 from the area 15 between opposing end portions of both the tables 11 and 12 to the third line-shaped mark Mc illustrated in FIG. 7. Such configuration of the first glass sheet piece Gs is also applied to the second glass sheet piece Gt illustrated in FIG. 14 in the same manner.

In such state, first, the first side G1 of the first glass sheet piece Gs is aligned with the first line-shaped mark Ma. As a result, the fourth scribe line S4 of the first glass sheet piece Gs is positioned in the area 15 between opposing end portions of both the tables 11 and 12, and then the splitting step 3 is performed in the same manner as in the above-mentioned case. The split unnecessary part is removed. After that, regarding the remaining glass sheet piece obtained by removing the unnecessary parts from the first glass sheet piece Gs illustrated in FIG. 14, the portion that has been the fourth scribe line S4 becomes the first side, and hence this first side is aligned with the third line-shaped mark Mc. As a result, the fifth scribe line S5 of the glass sheet piece is positioned in the area 15 between opposing end portions of both the tables 11 and 12, and then the splitting step 3 is performed in the same manner as in the above-mentioned case. A glass sheet piece corresponding to the split product region Gx is accommodated. After that, regarding the remaining glass sheet piece having the glass sheet piece corresponding to the product region Gx removed therefrom, the portion that has been the fifth scribe line S5 becomes the first side, and hence this first side is aligned with the third line-shaped mark Mc. As a result, the sixth scribe line S6 of the glass sheet piece is positioned in the area 15 between opposing end portions of both the tables 11 and 12, and then the splitting step 3 is performed in the same manner as in the above-mentioned case. A glass sheet piece corresponding to the split product region Gz is accommodated, and the unnecessary parts are removed. The second glass sheet piece Gt illustrated in FIG. 14 is also subjected to the same processing as the above-mentioned processing, and glass sheet pieces corresponding to the product regions Gw and Gy, respectively, are accommodated.

Next, the action and effect of the manufacturing method for a glass sheet described above are described.

According to the manufacturing method, when the first side of the glass sheet G (comprising the glass sheet pieces Gs and Gt) is aligned with the line-shaped mark projected by the laser marker, the scribe line of the glass sheet G can be accurately positioned in the area 15 between opposing end portions (bending stress applying portion) between the fixed table 11 and the movable table 12. More specifically, when a gap is present in the area 15 between opposing end portions of both the tables 11 and 12, the scribe line of the glass sheet G can be accurately positioned at the center position of the gap in the length direction. In addition, even when it is difficult to see the scribe line, the scribe line of the glass sheet G can be accurately positioned at the center position of the area 15 between opposing end portions of both the tables 11 and 12 in the length direction. As a result, the glass sheet G can be appropriately split along the scribe line by applying a bending stress to an optimum position of the glass sheet G. In addition, the laser marker is held so as to be slidable in the length direction, and hence the position in the length direction onto which the line-shaped mark is projected can be easily changed. Further, the resin sheet 9 is laid under the glass sheet G, and hence the situation in which the lower surface (back surface) of the glass sheet G is scratched or the like at the time of positioning is less liable to occur, and the glass sheet G is appropriately protected.

In addition, the line-shaped mark is projected onto the protruding portion 9a of the resin sheet 9, and hence positional displacement at the time of alignment of the first side of the glass sheet G with the line-shaped mark is less liable to occur as compared to the case in which the mark is directly projected onto an upper surface (front surface) of the movable table 12. As a result, alignment of the first side of the glass sheet G with the line-shaped mark can be further accurately performed.

Further, the resin sheet 9 lacks translucency, and hence the upper surface of the movable table 12 positioned under the protruding portion 9a cannot be seen. In this case, even when an attempt is made to accurately position the scribe line in the area 15 between opposing end portions (bending stress applying portion) between the fixed table 11 and the movable table 12 while visually observing the scribe line, accurate positioning is difficult. According to this manufacturing method, even when the resin sheet 9 lacking translucency is used, the scribe line of the glass sheet G can be accurately positioned in the area 15 between opposing end portions (bending stress applying portion) between the fixed table 11 and the movable table 12 by aligning the first side of the glass sheet G (comprising the glass sheet pieces Gs and Gt) with the line-shaped mark projected by the laser marker.

In addition, in the positioning step 2, the first side of the glass sheet G is aligned with the line-shaped mark by integrally moving the glass sheet G and the resin sheet 9, and hence it is not required to slide the glass sheet G in contact with an upper surface of the resin sheet 9. As a result, the situation in which the lower surface of the glass sheet G is scratched or the like is further less liable to occur.

Further, in the positioning step 2, a plurality of laser markers that project line-shaped marks onto a plurality of locations of the resin sheet 9 in the length direction are divided into two groups having different width direction positions and height direction positions. Accordingly, the installation spaces of the laser markers are less liable to be subject to restrictions, which is advantageous from the viewpoint of layout. In particular, regarding the laser markers 16a and 16b having one lower rail 17 in common, there is a restriction on a minimum spacing distance. When the interval between the adjacent line-shaped marks is narrowed, there is a risk in that the line-shaped marks may not be arranged because the adjacent laser markers 16a and 16b interfere with each other. Such situation can be avoided by arranging the laser marker 16c arranged above between the laser markers 16a and 16b.

In addition, in the splitting step 3, a bending stress can be applied to the formation region of the scribe line of the glass sheet G in the area 15 between opposing end portions of both the tables 11 and 12 by merely folding the fixed table 11 and the movable table 12, and the splitting operation of the glass sheet G can be easily and quickly performed.

Further, in the splitting step 3, the fixed table 11 and the movable table 12 hold the glass sheet G by suction through the resin sheet 9, and hence positional displacement of the glass sheet G is less liable to occur when both the tables 11 and 12 are folded to split the glass sheet G. As a result, the glass sheet G can be further accurately split along the scribe line.

In addition, in the glass sheet G prepared in the preparation step 1, the recess line 5 by plastic deformation is formed on the surface, and then the initial crack 7 is caused to propagate along the recess line 5 to form a scribe line. Thus, it is difficult to see the scribe line. Even with such glass sheet G, when the scribe line is positioned in the area 15 between opposing end portions of both the tables 11 and 12, it is only required to align the first side of the glass sheet G with the line-shaped mark. Accordingly, a problem caused by difficulty in seeing the scribe line does not occur.

The present invention is not limited to the above-mentioned embodiment, and various variations are possible. One example thereof is described below.

In the above-mentioned embodiment, of two sides of the glass sheet parallel to the scribe line, the side (first side) on the end portion side on the outer side of the movable table is aligned with the line-shaped mark. However, of the two sides, the side on the end portion side on the outer side of the fixed table may be aligned with the line-shaped mark. In this case, the laser markers are arranged on the upper side of the center portion of the fixed table in the width direction and on one end side of the fixed table in the width direction.

In the above-mentioned embodiment, four laser markers are provided, and four line-shaped marks are projected. However, the number of the laser markers and the number of line-shaped marks are not limited thereto.

In the above-mentioned embodiment, the line-shaped (linear) mark is projected by the laser marker. However, the mark is not limited to the line-shaped mark, and may be, for example, a spot-shaped mark. In this case, for example, one mark having a spot shape or the like or a plurality of marks each having a spot shape or the like along the width direction may be projected per location in the length direction.

In the above-mentioned embodiment, the resin sheet is caused to protrude from the four sides of the glass sheet. However, as long as the resin sheet protrudes from the first side of the glass sheet, the resin sheet is not required to protrude from other sides.

In the above-mentioned embodiment, the mark by the laser marker is projected onto the upper surface of the protruding portion of the resin sheet (protruding portion from the first side of the glass sheet) on the placement table. However, the mark may be directly projected onto the upper surface of the placement table by preventing the resin sheet from protruding from the first side of the glass sheet.

In the above-mentioned embodiment, the glass sheet is held by suction with a negative pressure in the splitting step 3. However, the glass sheet may be held without suction with a negative pressure.

In the above-mentioned embodiment, the resin sheet is set to have air permeability, but the resin sheet is not required to have air permeability. In this case, it is desired to use a resin sheet on which the glass sheet does not easily slide due to friction. In addition, even when the resin sheet does not have air permeability, it is preferred that the resin sheet be held by suction with a negative pressure by the fixed table and the movable table. As a result, as described above, through use of the resin sheet on which the glass sheet does not easily slide due to friction, the glass sheet can be satisfactorily held on the resin sheet.

In the above-mentioned embodiment, the placement table is formed of the fixed table and the movable table, but both the tables may be movable tables. Further, the placement table is not required to comprise two tables that can be folded, and may be provided with a bending stress applying portion that protrudes upward in a middle portion of an upper surface of, for example, a surface plate or the like in the length direction.

In the above-mentioned embodiment, the recess line by plastic deformation is formed on the surface of the glass sheet through use of the scribe tip, and then the initial crack is caused to propagate along the recess line, to thereby form the scribe line. However, the scribe line may be formed by other methods, for example, by forming a groove on the surface of the glass sheet through use of a scribe wheel.

REFERENCE SIGNS LIST 1 preparation step
2 positioning step
3 splitting step
5 recess line
7 initial crack
8 manufacturing apparatus for glass sheet
9 resin sheet
9a protruding portion of resin sheet
10 placement table
11 fixed table
12 movable table
15 area between opposing end portions (bending stress applying portion)
16a to 16d laser marker
G glass sheet
G1 first side of glass sheet
Ma to Md line-shaped mark
S scribe line
S1 to S6 scribe line

The invention claimed is:

1. A manufacturing method for a glass sheet, comprising:
a preparation step of preparing a glass sheet having a scribe line formed thereon;
a positioning step of placing the prepared glass sheet on a placement table and positioning the glass sheet so that the scribe line is positioned in a bending stress applying portion of the placement table; and
a splitting step of splitting the glass sheet along the scribe line by applying, after the positioning step, a bending stress to a formation region of the scribe line by the bending stress applying portion,
wherein the positioning step comprises:
laying a resin sheet under the glass sheet on the placement table; and
aligning one side of the glass sheet extending in a direction along the scribe line with a mark projected onto the placement table by a laser marker.

2. The manufacturing method for a glass sheet according to claim 1, wherein the positioning step comprises:
causing the resin sheet to protrude from the one side of the glass sheet; and
projecting the mark onto an upper surface of a protruding portion.

3. The manufacturing method for a glass sheet according to claim 1, wherein the resin sheet does not have translucency.

4. The manufacturing method for a glass sheet according to claim 1, wherein the positioning step comprises:
aligning the one side of the glass sheet with the mark by integrally moving the glass sheet and the resin sheet.

5. The manufacturing method for a glass sheet according to claim 1, wherein the mark is a line-shaped mark extending in the direction along the scribe line.

6. The manufacturing method for a glass sheet according to claim 1, wherein a plurality of laser markers are provided; and
the marks are projected onto a plurality of locations of the resin sheet in a direction orthogonal to the scribe line by the plurality of laser markers.

7. The manufacturing method for a glass sheet according to claim 6, wherein the marks projected onto the plurality of locations comprise a mark projected from an upper side by one of the plurality of laser markers installed on an upper side of the placement table and a mark projected from a lateral side by one of the plurality of laser markers installed on one end side of the placement table in the direction along the scribe line.

8. The manufacturing method for a glass sheet according to claim 1, wherein the scribe line is formed by causing a scribe tip to move while pressing a surface of the glass sheet, to thereby form a recess line by plastic deformation on the surface of the glass sheet, and then causing an initial crack to propagate along the recess line.

9. The manufacturing method for a glass sheet according to claim 1,
wherein the placement table is formed of a pair of placement tables foldably coupled to each other, and
wherein the bending stress applying portion is an area between opposing end portions of the pair of placement tables.

10. The manufacturing method for a glass sheet according to claim 9, wherein the splitting step comprises:
causing the pair of placement tables to hold the glass sheet by suction through the resin sheet.

* * * * *